United States Patent [19]

LaBudde

[11] Patent Number: 4,614,986
[45] Date of Patent: Sep. 30, 1986

[54] MAGNETIC SERVO WITH IMPROVED TRACKING SYSTEM

[76] Inventor: Edward V. LaBudde, 3401 Daniel St., Newbury Park, Calif. 91320

[21] Appl. No.: 547,366

[22] Filed: Oct. 31, 1983

[51] Int. Cl.$^4$ .............................................. G11B 5/54
[52] U.S. Cl. .................................... 360/78; 318/593; 360/77
[58] Field of Search .................... 360/77, 78; 318/593

[56] References Cited

U.S. PATENT DOCUMENTS

| | | | |
|---|---|---|---|
| 2,924,461 | 2/1960 | Bobb | 369/247 |
| 3,281,154 | 10/1966 | Schmetter | 369/247 |
| 3,886,595 | 5/1975 | Swaim et al. | 360/106 |
| 3,924,268 | 12/1975 | McIntosh et al. | 360/78 |
| 4,121,837 | 10/1978 | Tominari | 369/247 |
| 4,138,121 | 2/1979 | Nakajima | 274/23 R |
| 4,160,268 | 7/1979 | Goto | 358/128 |
| 4,163,168 | 7/1979 | Ishikawa | 310/328 |
| 4,170,360 | 10/1979 | Ohsawa | 274/23 R |
| 4,188,645 | 2/1980 | Ragle | 360/75 |
| 4,214,756 | 7/1980 | Ohmura | 274/23 R |
| 4,214,757 | 7/1980 | Kusaka | 274/23 R |
| 4,322,840 | 3/1982 | Kusaka | 369/220 |
| 4,366,563 | 12/1982 | Riddle | 369/43 |
| 4,513,332 | 4/1985 | Merritt et al. | 360/77 |

FOREIGN PATENT DOCUMENTS 56-93144  7/1981  Japan ..................... 360/78

OTHER PUBLICATIONS

Lu, Floppy Disks Push Density Limits, High Technology, Aug. '83, pp. 18-19.
IBM Technical Disclosure Bulletin, vol. 17, No. 10, Mar. 1975, pp. 3016-3018, Disk File Actuator, Lissner et al.

Primary Examiner—George G. Stellar
Attorney, Agent, or Firm—Koppel & Harris

[57] ABSTRACT

A two-part head positioning system has a tracking motor for moving the head through relatively small distances so that it follows the track of a medium and moves between adjacent tracks and a seek motor for moving the tracking motor and head through relatively large distances between non-adjacent tracks. The system has been improved by mechanically isolating the seek motor from the tracking motor so that small movements from the tracking motor are not transmitted to or from the seek motor and the arm between that motor and the tracking motor. The tracking motor and the mechanical isolator are in one unit. A magnet is mounted on the head support, which extends from the tracking motor to the head. This magnet is positioned within an electromagnetic coil that is mounted within magnetic shielding and fixed to the arm extending to the seek motor. Selective energization of the electromagnetic coil moves the magnet and the head support laterally in the coil. Flexures extend between the magnetic shield and the head support and allow relatively free movement of the head support under control of the magnetics perpendicular to the tracks of the medium but no movement along any other axis or pivoting about any axis. Different configurations for the magnetic shield and the flexures are disclosed. The tracking motor can also be controlled in that the position of the head support relative to the arm is a function of the current to the tracking motor. By proper connection of the servo loops, noise and other extraneous portions of the position error transfer function are cancelled. A filter may be used to cancel noise created by the seek motor. A system for shorting the tracking motor to restore it to its null position and using induced current generated by the tracking motor to hold the tracking motor in its null position is also disclosed.

21 Claims, 15 Drawing Figures

MAGNETIC SERVO WITH IMPROVED TRACKING SYSTEM

BACKGROUND OF THE INVENTION

1. Field of Invention

The present invention relates to a device for improved movement by the transducer head, which moves relative to a rotating or otherwise moving storage medium.

2. Background of the Prior Art

For speed and convenience, it is desirable to maximize storage capabilities on magnetic mediums such as computer disks. Although the discussion in the specification will deal primarily with magnetic disks, it works with other precise tracking systems such as video disks, laser audio disks and the like. The transducer head is controlled by a servo-system which must move the head between tracks and also must maintain the head centered over the desired track. To maintain centering or even for relatively small moves between tracks, small and precise movement is required. For larger moves, speed is important. The larger moves are referred to as the seek movements, and the smaller moves are referred to as the tracking or the fine movements. Increasing the motor size to increase he speed of seek moves makes it more difficult for the motor to make the fine movements quickly and accurately. The higher power seeking motor and the long arm that must connect the motor to the head causes high frequently mechanical resonances in the head, which limits the bandwidth for seeking to about 300 Hz. For high density magnetic mediums, a bandwidth greater than 300 Hz is needed. It is anticipated that future media will need a track pitch above 1000 tracks per inch (39 tracks/mm), which will require a tracking bandwidth over 500 Hz.

To overcome this problem, it has been proposed to use separate motors for seeking and tracking. An example is described in Lu "Floppy Disks Push Density Limits," *High Technology*, p. 18 (August 1983), and Ragle, U.S. Pat. No. 4,188,645 (1980). The Lu article discusses a two motor system, a course stepper motor for seek movement and a fine stepper motor for tracking movements. The "fine motor" in the Regal patent are several pair of piezo-flexure arrays. The seek motor can be a stepper motor or a linear motor. Linear motors tend to be faster but require servo mechanisms for positioning and to sense drift after the motor reaches a position. Stepper motors tend to be somewhat slower, but they do not drift. The problem with prior art two-motor systems is that the smaller motor transmits the high frequently resonances from the arm connecting the seek motor to the smaller motor, and this forces a limitation on bandwidth. Also, as a linear seek motor drifts, one must have the tracking motor compensate for the drift. There are limits, however, to the amount of compensation because the tracking motor normally has small limits of travel. Therefore, a servo system is necessary for correct position of the seek arm.

It is an object of the present invention to disclose and provide a head moving system that maximizes the effective bandwidth to provide for high track pitch, improved accuracy and faster seek times.

A key feature of the invention is mechanical isolation between the head-tracking motor combination and the seek motor and its arm to eliminate seek motor resonance from the tracking motor servo-loop to provide very high bandwidths. Specifically, the head positioning apparatus of the present invention has a fine positioning means attached to the head for moving the head through relatively small distances and a seek positioning means operably attached to the fine positioning means for moving the fine positioning means and the head through relatively large distances.

The mechanical isolator comprises a flexible connection between the fine positioner and the seek positioner. The fine positioner comprises an electromagnetic coil attached to the arm. A head support, a blade-like structure which holds the head, extends through the coil. A second magnet is mounted on the head support inside the coil, and controlled, selected application of electricity to the coil moves the magnet and the head support. A magnetic shield surrounds the coil, and the flexible members are attached near the ends of the shield. The shape of the flexible member is such that only one dimensional movement of the head and head support is allowed. Different shapes are disclosed. Various forms of shielding are also provided.

If the seek motor is a stepper motor, one will normally lock the tracking motor in its null position during seek movements. The stepper motor moves the head to the middle of the desired track, and then the tracking motor, with a servo mechanism reading position information from the disk, follows the track. With a linear seek motor, one must sense the position of the head relative to the arm of the seek motor. Sensing systems in the form of light or magnetic sensors can be used for position information. The relative position, however, is also a function of the current fed to the tracking motor. It is an object of the present invention to use tracking motor current for sensing the relative position of the head relative to the seek motor and arm.

Because ultimately, head position information is obtained from the medium, one may want to cage or lock the tracking motor in its null position during seek movements. It is an object of the present invention to do that easily and inexpensively with a minimum of parts.

DETAILED DESCRIPTION OF THE PREFERRED EMBODIMENT

Figure 1:
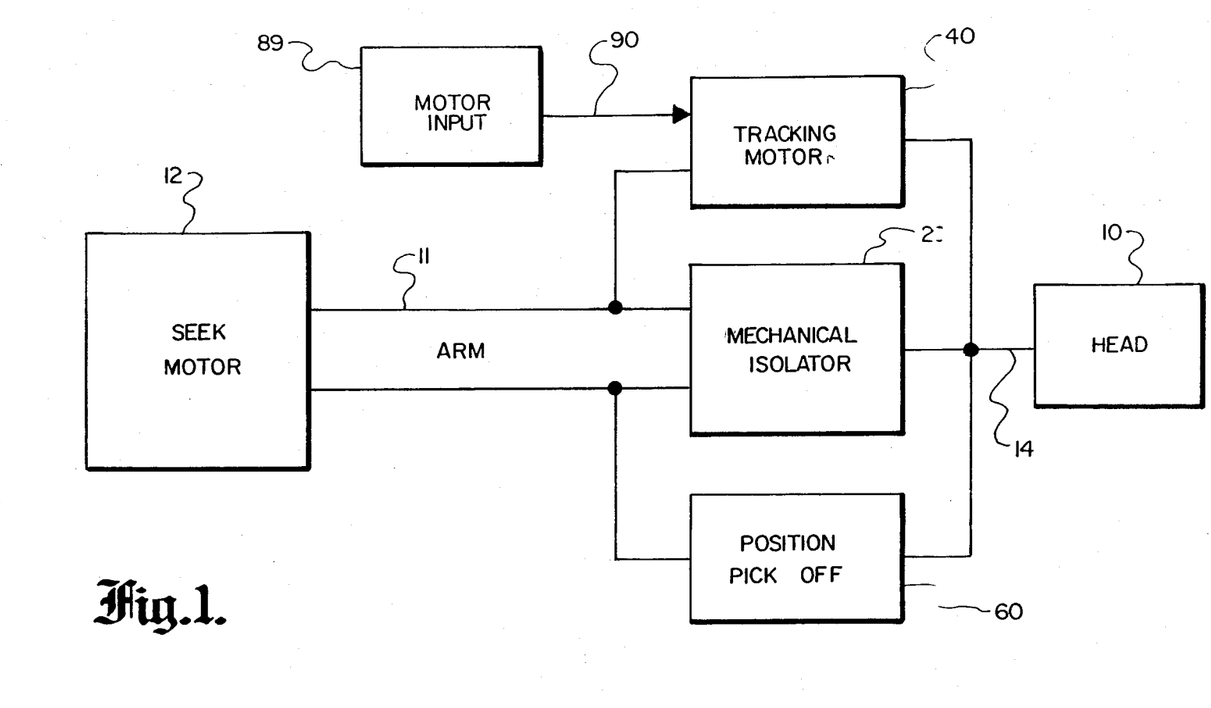
FIG. 1 is a block diagram of the head positioning device of the present invention.

The FIG. 1 block diagram gives an overall understanding of the concept of the present invention. As with any such system, head 10 must be positioned accurately on a track of a magnetic or other medum. In the simplest systems (for which no diagram is presented) a head is connected through an arm to a seek motor. Seek motor 12 is typically a stepper or linear motor acting under computer control and by pushing and pulling on arm 11, head 10 is transposed between tracks.

As a modification, a second, fine tracking motor can be interspersed between the arm and the head, but as previously stated, movement of the head by the tracking motor transmits high frequency resonance from the arm, and this limits the bandwidth. Unfortunately, the single motor system with high speed seek and the necessary long strokes requires a large motor with a heavy structure, which has a limited bandwidth for track following.

The present invention offers an improvement over the prior art by the inclusion of a mechanical isolator 20 (FIG. 1) and a fine tracking motor 40. A position pickoff 60 senses the extent to which tracking motor 40 moves head 10 through head support 14. Mechanical isolator 20, tracking motor 40 and position pickoff 60 are all in one unit, the construction of which will be described in greater detail below. The mechanical isolator prevents small movements of head 14 by tracking motor 40 to cause resonance in arm 11 and thus extends the bandwidth. Tracking motor 40 can also lock head 10 relative to the tracking motor during actuation of the seek motor utilizing structure described below so that the high inertia movement by the seek motor does not cause movement of head support 14 relative to tracking motor 40.

1. The Mechanical Isolator

The mechanical isolator of the present invention comprises a flexible connection between the fine, tracking motor 40 and the seek motor 12. These elements are shown in a first exemplary embodiment in FIG. 2, which is not drawn to scale. The left end of arm 11 connects to seek motor 12. Arm 11 is preferably aluminum or other light, non-ferrous metal. Tracking motor 40, which is mounted on arm 11, includes motive means 41 having two electromagnetic coils 41 and 42 on aluminum form 43. Head support 14 also is formed of aluminum about 0.5 mm thick. A magnetic shield means 43, preferably of a relatively soft sheet steel, surrounds coils 41 and 42 to close the magnetic circuit and shield the flux. The left end of head support 14 extends into space 47 inside coils 41 and 42, and a permanent magnet 49 is mounted on head support 14 inside space 47. When amplifier 89 energizes coils 41 and 42 through lead 90 (FIGS. 1 and 11), magnet 49 is urged to the left or right (FIG. 2) depending on the difference in the current flow in coils 41 and 42. Amp 89 is actually two amplifiers 89A and 89B (FIG. 12) in the exemplary embodiment. The opposite force is transmitted to arm 11 and seek motor 12. If these elements absorb the forces, they vibrate and resonance tends to occur.

Figures 2, 3:
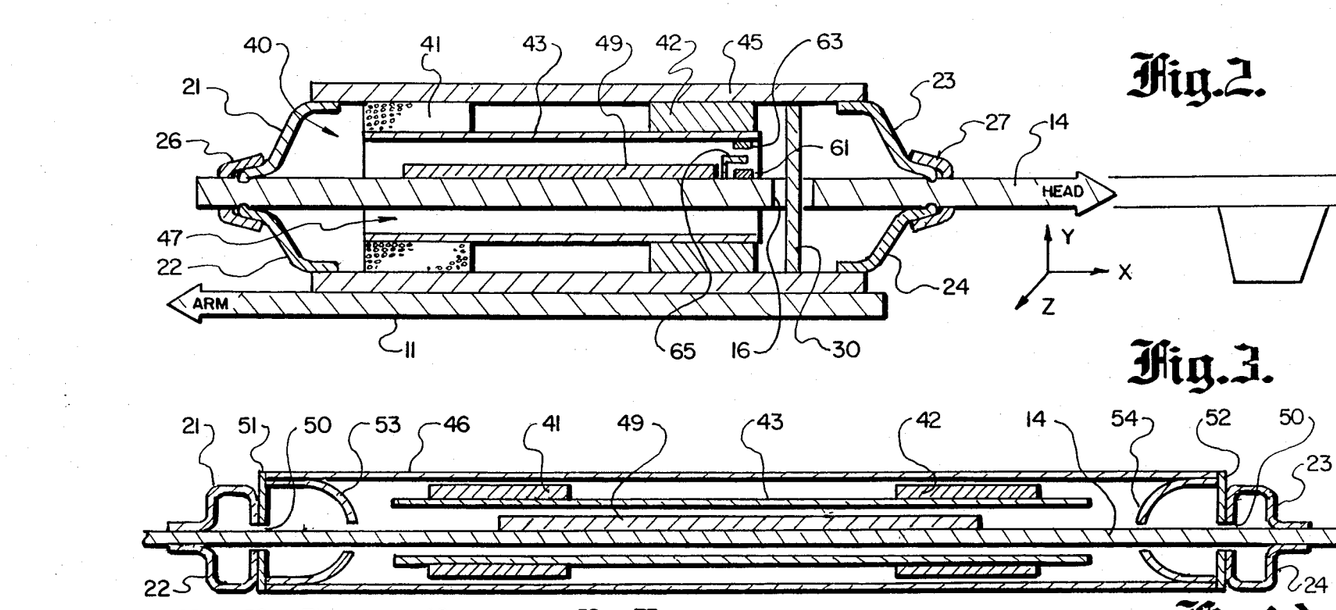
FIG. 2 is an elevation (not to scale) in section of one embodiment of the the fine, tracking positioning apparatus of the present invention showing its relationship to the arm attached to the seek motor.
FIG. 3 is a side elevation (not to scale) of an alternative embodiment of the fine positioning system of the present invention.
Figure 4:
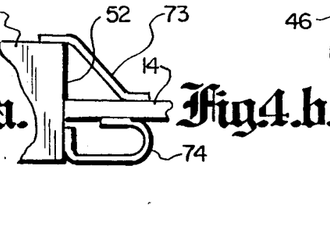
FIGS. 4A-4D are side elevations of alternative embodiments of the flexible members.
Figures 5, 6, 7:
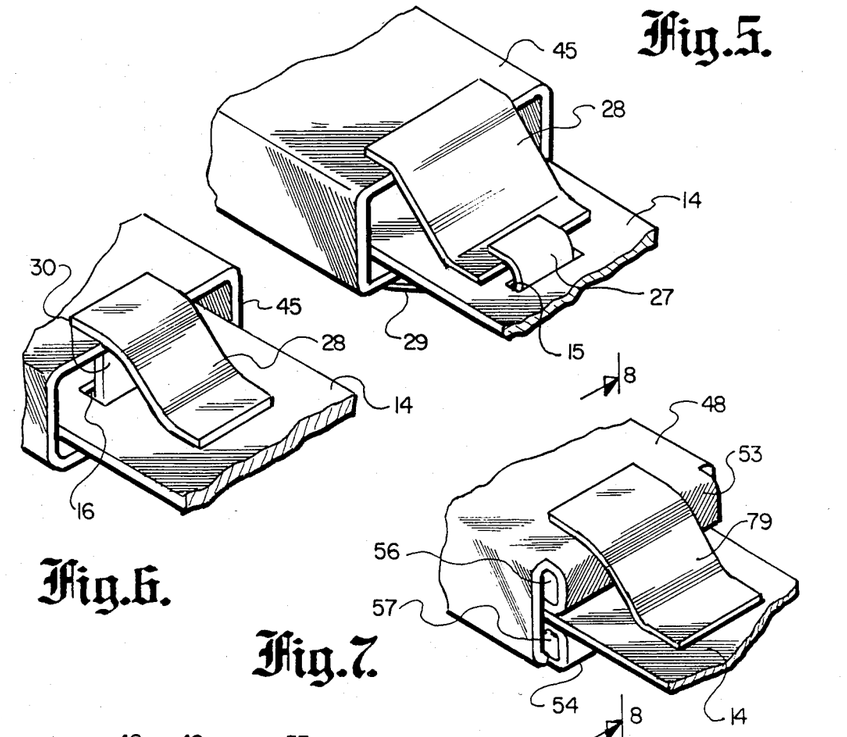
FIGS. 5, 6, and 7 are perspective views the magnetic shield to which are mounted the flexible members used to isolate the head from the seek motor.

In the embodiment of FIG. 2, the mechanical isolation means for isolating movement from tracking motor 40 to seek motor 12 and arm 11 comprises four flexible members, flexures 21–24. These can be formed of relatively soft steel, and they too will assist in shielding the magnetic flux. Because of their flexibility, flexures 21–24 act to prevent kinetic energy from the high frequency movements of head support 14 from causing resonance in arm 11. Flexures 21–24 can bend to some degree, which is necessary to permit tracking motor 40 to move head support 14. They may be attached in any acceptable way to shield 45. See, for example, FIGS. 3, 4A–D, and 5–10 which are discussed below. FIG. 2 shows flexures 21–24 attached to the inside of shield 45. They are held to head support 14 by means of shunts 26 and 27. The shunts are also formed of relatively soft steel and assist in shielding the magnetic flux. As shown in FIG. 5, shunt 27 extends through opening 15 in head support 14. Unlike shielding members 21–24, which are attached to the inside of shield 45, in FIG. 5, flexures 28 and 29 are attached to the outside of shield 45. The manner and location in which the flexures are attached to shielding member will affect their mechanical and shielding characteristics as well as the ease in which they can be attached to shielding member 45 and head support 14.

The construction of mechanical isolator 20 is designed to permit a low force to move head 10 along the x axis (FIG. 2) a minimum distance of ±0.005 inches (0.13 mm). A substantially higher force is needed to move head support 14 along the y and z axis perpendicular to the desired movement of the head along the x axis. Just as importantly, the arrangement of mechanical isolator 20 prevents pivoting of head support about any axis. Some of the different configurations for the flexures shown in some of the alternative embodiments have different characteristics in allowing x axis movement while inhibiting y and z axis movement and pivoting about any of the axes.

Because of the magnetic field created by coils 41 and 42 in close proximity to the head and to the magnetic medium, effective shielding is necessary. As previously stated, flexures 21–24 provide some shielding. As a alternative additional shielding is provided by a vertical shield (FIGS. 2 and 6) that extends from the top and bottom of main shield 45 through opening 16 in head support 14.

FIG. 3 shows an alternative embodiment. There, magnetic shield 46 forms a rectangular box-like structure closed at its ends with the exception of slots 50 through end walls 51 and 52. Shielding cups 53 and 54 attached to the inside of shield 46 and/or the inside of end walls 51 and 52 are also provided to shield the magnetic flux from coils 41 and 42 and magnet 49 (FIG. 3). Once again, coils 41 and 42 are around form 43, and shield 46 extends around the coils. End walls 51 and 52 can be folded over from the main portion of shield 46, and it is best to minimize gaps through which magnetic flux can leak.

Flexures 31–34 in this embodiment are of a different configuration than flexures 21–24 and are attached to the end walls 51 and 52 of shielding member 46. This is but one of many possibilities. FIG. 4B shows a variety of possible flexures. Normally the top and bottom flexures (e.g. members 71 and 72 in FIG. 4A) are identical or mirror images of each other. The end of the flexure connected to shielding member 46 may be folded over and connected to end wall 52 (flexures 71, 72 and 74–78), or it may overlap the top or bottom surface of shielding member 46 (flexure 73). Likewise, the flexures may extend outwardly away from shielding member 45

(flexures 71, 72, 73 and 75-78), or they may be folded or looped back toward the shielding member (flexure member 74). Different shapes will yield different characteristics. For example, flexible member 77 (FIG. 4D) is more complaint than its stiffer counterpart, flexure 78. Likewise, flexure 73 is stiffer than flexure 74 (FIG. 4B). Some shapes offer unique characteristics. Flexures 75 and 76 (FIG. 4C) appear to be very stiff in preventing vertical movements but very complaint in desired movements along the x axis. All of the flexures used may be held in place by an adhesive, by a mechanical connector similar to shunts 26 and 27 or by some other means.

Figures 8, 9, 10:
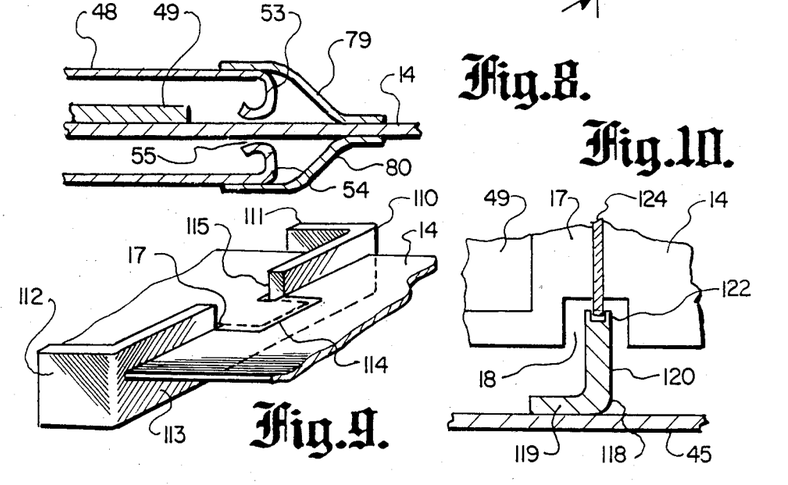
FIG. 8 is a sectional view in elevation through plane 8—8 in FIG. 7 of a modified connection between the flexible members and the shield.
FIG. 9 is a perspective view of a modified flexure.
FIG. 10 is a plan view in section of a modified embodiment showing the connection of the flexure to the head support.

A third embodiment is shown in FIGS. 7 and 8. There, magnetic shield 48 is formed with sides curved back on themselves to form flaps 53 and 54. Support arm 14 extends through gap 55, the space between flaps 53 and 54. Flaps 53 and 54 act as magnetic shields from the magnetic field generated by the coil (not shown) and magnet 49. The technique by which shield 48 in FIGS. 7 and 8 is made leaves open spaces such as spaces 56 and 57 (FIG. 7) through which magnetic flux may leak. If desired, one can fill spaces 56 and 57 with additional shielding material. For example, spaces 56 and 57 can be filled with an epoxy resin or glue that contains iron filings.

FIG. 9 shows still another embodiment of the flexure member. Flexure 110 has side walls 111 and 112 and a front face 113. Side walls 111 and 112 are attached, preferably by adhesive, to the sides of one of the magnetic shielding members such as member 45 (FIG. 2), 46 (FIG. 3), 48 (FIG. 7) or some other shape. A narrow portion 17 of head support 14 extends through slot 115 of flexure 110. Head support 14 is attached by an adhesive or other means to flap 114, which can be bent downward to form opening 115. The stiffness of flexure 110 is effected by the radius of curvature between end walls 111 and 112 and front wall 113.

The FIG. 10 embodiment uses a different flexure 118. End wall 119 is attached to magnetic shield 45 with adhesives or other means. Front wall 120 extends into opening 18 in head support 14. A notch 122 near the vertical center of front wall 120 receives a shaft 124 that extends through narrowed portion 17 of head support 14 where it engages a flexure member (not shown) similar to member 120. The radius of curvature between end wall 119 and front wall 120 determines in part the flexibility of flexure 118.

The magnetic shields (45 in FIG. 2, 46 in FIG. 3 and 48 in FIGS. 7 and 8) may be formed in many ways. Perhaps the easiest is to use cut sheet steel bent into the proper shape. The sheet can contain flaps that can be folded over each other along one wall, and the bending can also form the end shields (e.g. flaps 53 and 54 in FIGS. 7 and 8). To increase shielding on the end, caps may be added with a slot through which head support 14 can extend.

Effective shielding is important not only to minimize stray magnetic shields that may affect the head or magnetic medium, the shielding concentrates the magnetic field within tracking motor 40 so that less electrical energy must be inputted to yield the same mechanical output.

All of the embodiments show electromagnetic coils 41 and 42 held stationary, and the magnet moving with head support 14 is a permanent one. These can be reversed. Head support 14 can have a coil etched on its upper surface and the coils replaced by a permanent magnet. There are also other ways in which there can be an electromagnet on the surface of head 14.

Remember too that the elements in the figures are not drawn to scale. For example, in FIG. 3, support arm 14 is only about 0.5 mm thick and 15 mm wide. The length end walls 51 and 52 may be between about 22-31 mm. Magnet 49 is also very thin, being about 0.5 mm thick. Thus, the system operates on a very low mass so that minimum energy is needed to move head support 14.

2. The Position Pick Off

A position pickoff is used to determine the relative position of head 10 with respect to arm 11 (FIG. 1). If seek motor 12 is a stepper motor, its control is relatively simple and it accurately positions arm 11 properly within the precisional limits of the motor. Because head 10 receives its position information from the disk or other moving medium, no other position information is necessary. If, however, seek motor 12 is a linear motor, arm 11 and the entire tracking motor assembly can drift. It is then that a position pickoff is necessary.

FIG. 2 shows schematically one possible position pickoff. A light source such as LED 61 is mounted on the upper surface of head support 14 adjacent magnet 49, and a sensor 63 is mounted on form 43 where it can receive light from source 61. A blocking member 65 extends partially over sensor 63. As head support moves along the x axis, blocking member 65 partially blocks a portion of sensor 63. Therefore, the amount of light from source 61 reaching sensor 63 decreases. The sensor can also compare the relative illumination reaching the left and right sides of sensor 63. Both systems indicate the position of head support 14, source 61 and blocking member 65 with respect to sensor 63 and arm 11.

Figure 11:
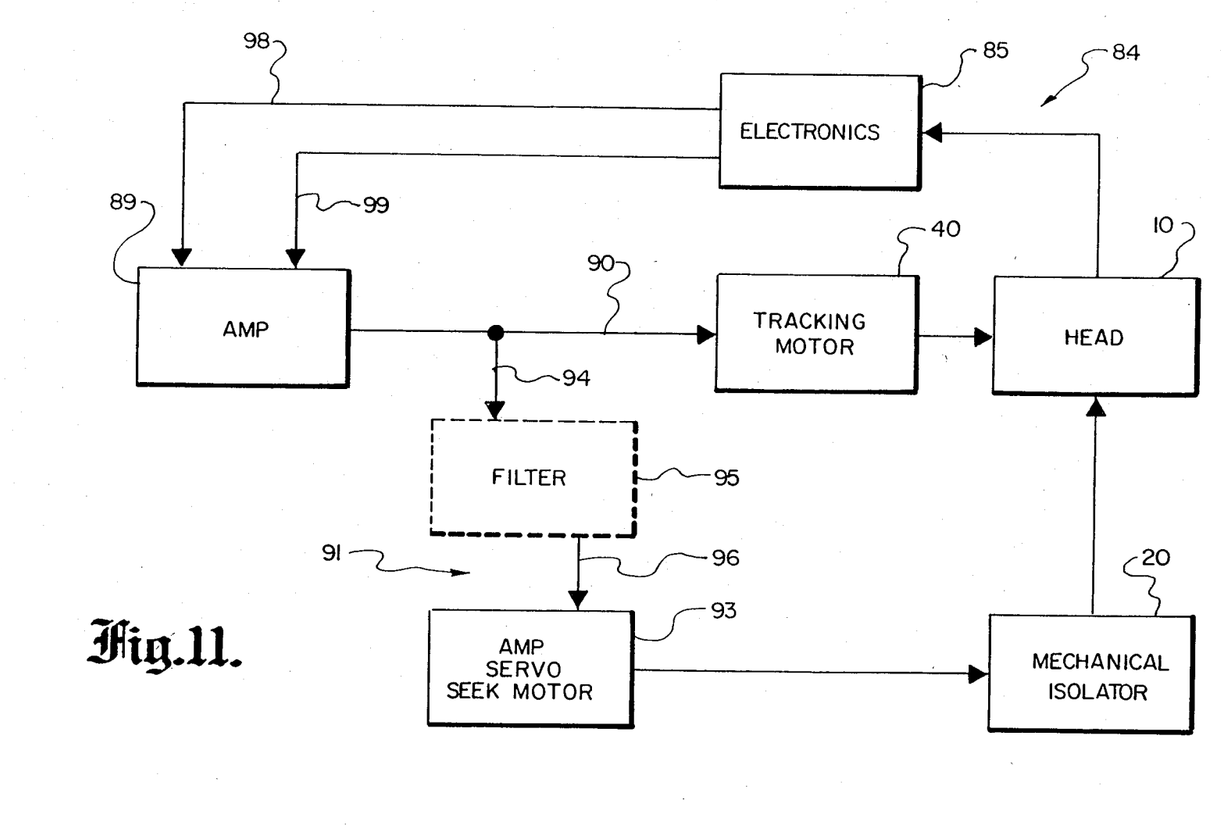
FIG. 11 is a block diagram showing the servo-loops that control the positioning of the head.

The additional elements and circuitry necessary in the position indicator using a LED raised the cost considerably. Because the position of support arm 14 is dependent on the current flow through coils 41 and 42 (FIGS. 2 or 3), an alternative embodiment uses the current for control. Referring to FIG. 11, a first, tracking servo system 84 is shown. Known electronic circuitry, shown schematically at 85 reads the position of head 10 relative to the medium. Electronics 85 generates a feedback signal through leads 98 and 99 into amplifier 89. As set forth more fully below, amp 89 can be in two sections 89A and 89B (FIG. 12), which separately drive coils 41 and 42 through leads 90A and 90B, and thus actuating tracking motor 40 for positioning head 10. Feedback loop 84 generates a first transfer function for controlling amp 89. The transfer function is complex and not linear.

The transfer function through loop 84 is as follows:

$$\left( \frac{S^2}{\omega_n^2} + \frac{2\delta S}{\omega_n} + 1 \right) / K_a \cdot K_t \cdot K_s \qquad (1)$$

where $\omega_n$ = natural frequency of mechanical isolator 20
$\delta$ = damping of mechanical isolator 20
$K_a$ = transfer gain of amplifier 89
$K_s$ = spring rate of mechanical isolator 20
$K_t$ = force constant of tracking motor 40

The control system also includes a second servo shown generally at 91. Normally, a linear motor is driven by an amplifier under control of a servo, usually a tachometer. In FIG. 9, a combined amp, seek motor and servo 93 receives a signal from amp 89 through line 94, filter 95 and line 96 (FIG. 9). Filter 95, which may be optional, is discussed below. At this point, a second transfer function is generated. Before the input from block 93 can move head 10, mechanical isolator 20 effects it. Although mechanical isolator 20 is a mechanical element, it too has an analogous transfer function. The transfer function through seek loop 91 is expressed by the following equation:

$$\frac{1}{\frac{S^2}{\omega_n^2} + \frac{2\delta s}{\omega_n} + 1} \cdot \frac{K_v}{S(St_2 + 1)} \quad (2)$$

Where
$K_v$ = seek servo velocity constant
$St_2$ = seek loop velocity bandwidth The first term of Equation 2 is the transfer function through the mechanical isolator and the second term is the transfer function through amp-servo-seek motor 93. When the gains through loops 87 and 91 are multiplied, the resultant transfer function is expressed by the following equation:

$$\frac{K_v}{K_a \cdot K_t \cdot K_s} \cdot \frac{1}{S(St_2 + 1)} \quad (3)$$

Note that the transfer function in the springs and mass have been cancelled out, and the resultant equation has only constants, $t_2$, which is the velocity loop bandwidth and a second order Laplace differential operator. If desired, a filter 95 (FIG. 11) can be added to supress high frequency noise in seek motor 12 which would supress this last part of the equation. Typically, the filter is set in a range of 500–1000 Hz. Therefore, the resulting position error transfer function from tracking motor 40 is expressed as follows:

$$\text{Position Error} = \frac{\text{Output voltage}}{\text{Head Displacement}} = \frac{1}{K_a K_t K_s} \quad (4)$$

As a result, all complex position of the equation are eliminated so that noise and the complexities of the mechanical elements have no effect on the control. Thus, the displacement of tracking motor 40 is a function of its current and the seek servo loop provides a stable, velocity controlled follow up servo with no consequence of the mechanical isolator on the closed loop stability or bandwidth.

3. Caging System

Figure 12:
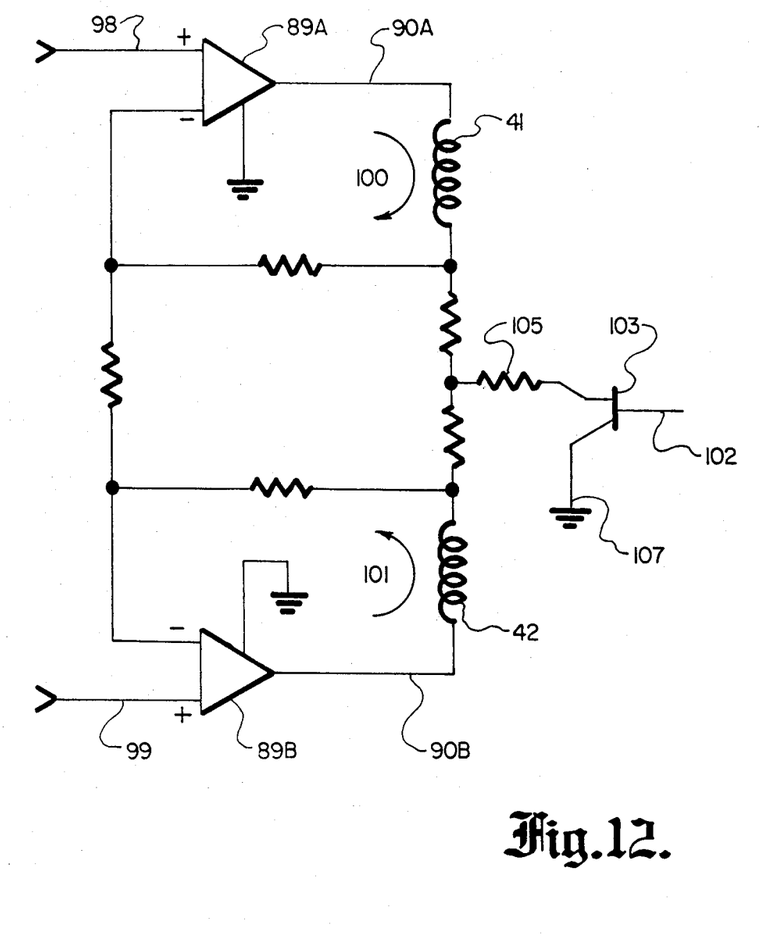
FIG. 12 is a circuit diagram of a means in the present invention for blocking or caging the head with respect to the arm of the present invention during movement by the seek motor.

It may be desirable to have the tracking motor 40 return to its null position (FIG. 2) and remain stationary when seek motor 12 moves arm 11 and tracking motor 40. FIG. 12 shows the circuitry and its relationship to the apparatus of the present invention for accomplishing that. The circuit shows that a differential input between inputs 98 and 99 through amplifiers 89A and 89B and leads 90A and 90B provide current loops 100 and 101 such that current flows through coils 41 and 42. As the current in each coil changes as the output from amps 89A and 89B changes, the magnetic flux created by coils 41 and 42 differs to create a resultant force that moves magnet 49 (FIG. 2) to the left or right. Caging of support arm 14 is accomplished as follows. Caging input 102 into transistor 103 closes normally open transistor 103 and allows current from loops 100 and 101 to flow through damping resistor 105 to ground at 107. Simultaneously, inputs 98 and 99 to amps 89A and 89B stop. The flexures (e.g. 21-24 (FIG. 2)) then begin to restore support arm 14 to its null position. Movement of magnet 49 relative to coils 41 and 42 generates a reverse current flow through coils 41 and 42, which dampens the movement of magnet 49 to its null position and prevents the magnet from greatly over-shooting its mark. Moreover, as magnet 49 moves a small distance beyond its null position, the magnet induces a reverse EMF in coils 41 and 42 so that the magnetic flux tends to move the magnet back toward its null position. In this manner, magnet 49 is caged.

Various modifications and changes may be made in the configuration described above that come within the spirit of this invention. The invention embraces all such changes and modifications coming within the scope of the appended claims.

I claim:

1. A method of positioning a head adjacent a moving medium comprising:
   (a) moving the head through relatively small movements by tracking means;
   (b) moving the tracking means and the head through larger movements between tracks of the magnetic medium by means of a seek positioning means;
   (c) mechanically isolating the fine tracking means from the seek positioning means to prevent movements of the tracking means from vibrating the seek positioning means; and
   (d) locking the tracking means when the seek positioning means moves the tracking means and the head through relatively large distances.

2. In a positioning device comprising a head for transferring information to or from a moving medium, tracking means attached to the head for moving the head through relatively small distances relative to the moving medium, and seek positioning means operably attached to the tracking means for moving the tracking means and the head through relatively large distances relative to the moving medium, the improvement comprising:
   mechanical isolation means between the fine positioning means and the seek positioning means for preventing the tracking means from transferring kinetic energy to or from the seek positioning means when the tracking means positions the head, the improvement further comprising the provision of the tracking means including locking means for locking the tracking means when the seek positioning means is activated to move the tracking means on the head.

3. In a positioning device comprising a head for transferring information to or from a moving medium, tracking means attached to the head for moving the head through relatively small distances relative to the moving medium, and seek positioning means operably attached to the tracking means for moving the tracking means and the head through relatively large distances relative to the moving medium, the improvement comprising:
   mechanical isolation means between the fine positioning means and the seek positioning means for preventing the tracking means from transferring kinetic energy to or from the seek positioning means when the tracking means positions the head, the mechanical isolation means comprising flexible connection means between the tracking means and the seek positioning means for absorbing small movements from the tracking means.

4. The positioning device of claim 3 wherein the tracking means comprises motive means and a head support extending between the motive means the head, the motive means comprising first magnetic means on the head support and second magnetic means fixed relative to the seek positioning means, one of the first and second magnetic means being selectively energizable to move the head support relative to the seek positioning means.

5. In the positioning device of claim 4, the seek positioning means comprising a motor and an arm between the motor and the tracking means, magnetic shield means on the arm, the second magnetic means being positioned within the magnetic shield means, the first magnetic means being positioned within the magnetic field of the second magnetic means whereby selective energization of one of the first and second magnetic means moves the first magnetic means relative to the second magnetic means.

6. In the positioning device of claim 5, the second magnetic means comprising an electromagnetic coil in a closed loop on the magnetic shield, the magnetic shield extending substantially around the electromagnetic coil, and the head support extending into the closed loop of the coil and positioning the first magnetic means within a closed loop.

7. In the positioning device of claim 4, the improvement further comprising:
the second magnetic means comprising two, spaced apart electromagnetic coils about the first magnetic means and fixed with respect to the seek positioning means, tracking actuator means for generating a current in the electromagnetic coils whereby the difference in the current through each of the coils creates a differential force that moves the first magnetic means and the head support relative to the seek positioning means, a normally opened caging switch, which when closed shorts any current through the coils, the movement of the first magnetic means relative to the coils when the switch is closed creating a reverse current in the coils tending to slow movement of the first magnetic means to a position centered between the two coils for generating a current through the coils tending to restore the first magnetic means to its position between the two coils.

8. In the positioning device of claim 3, the improvement further comprising the provision of the flexible connection comprising opposing flexures attached to the magnetic shield means above and below the head support and attached to the head support.

9. In the positioning device of claim 8, wherein the flexures are attached to the outside of the shielding means.

10. In the positioning device of claim 8, wherein the flexures are attached to the end of the shielding means.

11. In the positioning device of claim 8, the improvement further comprising shunt means extending through the head support and securing the flexures extending from the magnetic shielding means to the head support.

12. In the positioning device of claim 8, wherein the flexures extend along the outside of the head support and extending away from the shielding means.

13. In the positioning device of claim 8, wherein the flexures are looped around and in contact with the head support and extend toward the shielding means.

14. In a positioning device comprising a head for transferring information to or from a moving medium, tracking means attached to the head for moving the head through relatively small distances relative to the moving medium, and seek positioning means operably attached to the tracking means for moving the tracking means and the head through relatively large distances relative to the moving medium, the improvement comprising:
mechanical isolation means between the fine positioning means and the seek positioning means for preventing the tracking means from transferring kinetic energy to or from the seek positioning means when the tracking means positions the head and,
tracking actuator means operably attached to the tracking means for energizing the tracking means; seek actuating means operable attached to the seek positioning means for energizing the seek positioning means and arm means connecting the tracking means to the seek positioning means; head signal generating means for generating signals indicating the position of the head relative to the medium, tracking servo means for receiving a signal from the head signal generating means for controlling the tracking actuator means, the tracking servo means generating a first transfer function; arm servo means for receiving a signal from the seek actuator means for controlling the seek positioning means; and inverse servo means for receiving a signal from the tracking actuator means through the arm servo means, the seek positioning means, the seek actuator means and the mechanical isolation means for generating a second transfer function which is a constant times the inverse of the first transfer function.

15. In the positioning device of claim 14 the improvement further comprising a filter in the inverse servo means for cancelling high frequency signals generated by the seek positioning means.

16. A positioning device comprising a head for transferring information to a moving medium, tracking means attached to the head for moving the head through relatively small distances relative to the moving medium, seek positioning means operably attached to the tracking means for moving the tracking means and the head though relatively large distances relative to the moving medium, the tracking means comprising motive means and a head support extending between the motive means and the head, the motive means including a first magnetic means on the head support and two, spaced apart electromagnetic coils about the first magnetic means and fixed with respect to the seek positioning means, tracking actuator means for generating a current in the electromagnetic coils whereby the difference in the current through each of the coils creates a differential force that moves the first magnetic means and the head support relative to the seek positioning means, the improvement comprising the provision of:
a normally opened caging switch, which when closed shorts any current through the coils, the movement of the first magnetic means relative to the coils when the switch is closed creating a reverse current in the coils tending to slow movement of the first magnetic means to a position centered between the two coils and for generating a current through the coils tending to restore the first magnetic means to its position between the two coils.

17. In the positioning device of claim 16, the improvement further comprising restoring means for mechanically urging the first magnetic means to its position centered between the two coils.

18. A system for controlling the position of a head relative to a moving medium comprising:
   (a) tracking means for positioning the head and tracking actuator means operably attached to the tracking means for energizing the tracking means;
   (b) seek positioning means, seek actuating means operably attached to the seek positioning means for energizing the seek positioning means and arm means connecting the tracking means to the seek positioning means, the seek positioning means moving the tracking means, mechanical isolation means between the arm means and the seek positioning means for limiting force transfers between the arm means and the tracking means;
   (c) head signal generating means for generating signals indicating the position of the head relative to the medium, tracking servo means for receiving a signal from the head signal generating means for controlling the tracking actuator means, the tracking servo means generating a first transfer function;
   (d) arm servo means for receiving a signal from the seek actuator means for controlling the seek positioning means; and
   (e) inverse servo means for receiving a signal from the tracking actuator means though the arm servo means, the seek positioning means, the seek actuator means and the mechanical isolation means for generating a second transfer function which is a constant times the fine inverse of the transfer function.

19. The system of claim 18 further comprising a filter in the inverse servo means for cancelling high frequency signals generated by the seek positioning means.

20. The system of claim 19 wherein the filter eliminates some frequencies greater than 500 Hz.

21. The system of claim 19 wherein the filter cuts out frequencies in the range of between 500 Hz and 1000 Hz.

* * * * *